US009892382B2

(12) United States Patent
Record (10) Patent No.: US 9,892,382 B2
(45) Date of Patent: Feb. 13, 2018

(54) RECURRENCE DEFINITION IDENTIFICATION

(75) Inventor: Andrew D. Record, Durham, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 2866 days.

(21) Appl. No.: 11/419,061

(22) Filed: May 18, 2006

(65) Prior Publication Data

US 2007/0136119 A1 Jun. 14, 2007

Related U.S. Application Data

(60) Provisional application No. 60/597,545, filed on Dec. 8, 2005.

(51) Int. Cl.
*G06Q 10/10* (2012.01)
*G06Q 10/06* (2012.01)
*G06Q 10/00* (2012.01)
*G06Q 10/04* (2012.01)

(52) U.S. Cl.
CPC ........... *G06Q 10/109* (2013.01); *G06Q 10/04* (2013.01); *G06Q 10/06* (2013.01); *G06Q 10/1095* (2013.01)

(58) Field of Classification Search
CPC ........ G06Q 10/00; G06Q 10/04; G06Q 10/06; G06Q 10/10; G06Q 10/109
USPC ...................................... 705/7.11, 7.18, 7.24
See application file for complete search history.

(56) References Cited

U.S. PATENT DOCUMENTS

| 5,260,868 | A | | 11/1993 | Gupta et al. |
| 5,491,626 | A | | 2/1996 | Williams et al. |
| 5,813,013 | A | * | 9/1998 | Shakib ................ G06Q 10/109 |
| 5,848,132 | A | | 12/1998 | Morley et al. |
| 5,893,073 | A | * | 4/1999 | Kasso ................ G06F 17/2205 705/7.12 |
| 5,978,463 | A | | 11/1999 | Jurkevics et al. |
| 6,029,195 | A | * | 2/2000 | Herz ............................ 725/116 |
| 6,272,074 | B1 | * | 8/2001 | Winner ................ G06Q 10/109 368/10 |
| 6,360,217 | B1 | * | 3/2002 | Gopal .................. G06Q 10/109 |
| 6,369,840 | B1 | * | 4/2002 | Barnett ............ G06Q 10/06314 715/751 |

(Continued)

OTHER PUBLICATIONS

"MultiCalendar—Schedule Software Create . . . Edit . . . Manage . . . Sync appointments with Palm and Pocket PC Intuitive . . . Easily . . . Time Saving". Printed from Internet. Source and date unknown.

(Continued)

*Primary Examiner* — Nga B Nguyen
(74) *Attorney, Agent, or Firm* — Marcia L. Doubet (57) ABSTRACT

A solution for managing dates is provided, in which a recurrence definition that represents a list of dates using a recurrence rule is automatically identified. The recurrence definition may also include a set of exceptions, which account for variations from a recurring pattern in the list of dates. In one embodiment, an efficiency measure is obtained for each of various proposed recurrence definitions, and a recurrence definition that most efficiently represents the list of dates is identified. In one application, an event management (e.g., calendaring) program automatically identifies an efficient recurrence rule for a list of event occurrences.

17 Claims, 5 Drawing Sheets

(56) References Cited

U.S. PATENT DOCUMENTS

| | | | |
|---|---|---|---|
| 6,549,929 B1* | 4/2003 | Sullivan | H04N 5/44543 |
| | | | 348/E5.097 |
| 6,769,120 B1 | 7/2004 | Rodriguez | |
| 6,901,592 B2 | 5/2005 | Mar et al. | |
| 7,149,810 B1* | 12/2006 | Miller | G06Q 10/109 |
| | | | 709/206 |
| 7,370,282 B2* | 5/2008 | Cary | 715/772 |
| 2001/0054072 A1* | 12/2001 | Discolo | G06Q 10/109 |
| | | | 709/206 |
| 2003/0154116 A1* | 8/2003 | Lofton | G06Q 10/1095 |
| | | | 705/7.19 |
| 2005/0222971 A1* | 10/2005 | Cary | G06Q 10/109 |
| 2006/0265263 A1* | 11/2006 | Burns | G06Q 50/188 |
| | | | 705/80 |
| 2008/0140384 A1* | 6/2008 | Landau | G06F 17/27 |
| | | | 704/9 |

OTHER PUBLICATIONS

Dawson, F. et al, "RFC 2445—Internet Calendaring and Scheduling Core Object Specification (iCalendar)". Network Working Group, Nov. 1998, total pp. 32.

* cited by examiner

RECURRENCE DEFINITION IDENTIFICATION

REFERENCE TO PRIOR APPLICATION

The current application claims the benefit of U.S. Provisional Application No. 60/597,545, titled "Determining Most Efficient Representation for a List of Dates", filed on Dec. 8, 2005, which is hereby incorporated herein by reference.

FIELD OF THE INVENTION

The invention relates generally to managing dates, and more particularly, to a solution for identifying a recurrence definition that represents the dates.

BACKGROUND OF THE INVENTION

Event management systems, such as Lotus Notes offered by International Business Machines Corp. of Armonk, N.Y. (IBM), enable the scheduling of a recurring event using a recurrence rule. In particular, the recurrence rule defines how to determine the date(s) on which the event is scheduled to occur and/or has occurred. Typical types of recurrence rules include daily, weekly, month by day, month by date, and yearly. In general, a daily recurrence rule is used for events that occur once every one or more days, a weekly recurrence rule is used for events that occur once every one or more weeks, etc.

Frequently, a scheduled event occurrence may be rescheduled to a different date, time, location, and/or the like, or canceled. In these cases, a reschedule or cancellation will be required in addition to the recurrence rule in order to accurately represent the actual dates of the event occurrences. In general, a reschedule will identify the original scheduled event occurrence and include data on the date, time, location, etc., of the new event occurrence, while a cancellation may include only an identification of the canceled event occurrence. Frequent reschedules/cancellations of an event degrades the efficiency gains (e.g., storage space, processing, etc.) that are obtained by using the recurrence rule.

Often, users desire to transfer event information between two or more event management systems. For example, with the increasing popularity of handheld computing devices, scheduled events stored in one event management system (e.g., on an office personal computer) are often synchronized with another calendaring/event management system (e.g., on a handheld computing device). Similarly, event data may be shared with another system, such as Lotus Domino offered by IBM, which includes some event management capabilities. However, some calendaring/event management systems do not support the use of recurrence rules. As a result, a recurrence rule may be translated to a series of dates, which is transferred to such a system during synchronization. Similarly, an event management system that supports a recurrence rule may receive a series of dates from another system that does not support recurrence rules.

In view of the foregoing, a need exists to overcome one or more of the deficiencies in the related art.

BRIEF SUMMARY OF THE INVENTION

The invention provides a solution for managing dates, in which a recurrence definition that represents a list of dates using a recurrence rule is automatically identified. The recurrence definition may also include a set of exceptions, which account for variations from a recurring pattern in the list of dates. In one embodiment, an efficiency measure is obtained for each of various proposed recurrence definitions, and a recurrence definition that most efficiently represents the list of dates is identified. In one application, an event management (e.g., calendaring) program automatically identifies an efficient recurrence rule for a list of event occurrences.

A first aspect of the invention provides a method of managing dates using a recurrence definition, the method comprising: obtaining, by a first computer system from a second computer system over a communications network, a list of dates of previously-scheduled event occurrences, using a processor of the first computer system; and executing stored instructions, by the processor, to improve storage efficiency of a storage device from which a scheduling module operating on the first computer system manages storage of event data, comprising: from the list of dates of occurrences, using the processor for programmatically determining a recurrence definition that represents the list of dates of occurrences, the recurrence definition comprising a recurrence rule from which the dates of occurrences can be recreated: and storing the determined recurrence definition on the storage device instead of storing the list of dates of occurrences.

A second aspect of the invention provides a system for managing dates using a recurrence definition, the system comprising: a first computer system comprising a processor; and instructions which are executable, using the processor, to implement functions comprising: obtaining, by the first computer system from a second computer system over a communications network, a list of dates of previously-scheduled event occurrences; and improving storage efficiency of a storage device from which as scheduling module operating on the first computer system manages storage of event data, comprising: from the list of dates of occurrences, programmatically determining a recurrence definition that represents the list of dates of occurrences, the recurrence definition comprising a recurrence rule from which the dates of occurrences can be recreated; and storing the determined recurrence definition on the storage device instead of storing the list of dates if occurrences.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a solution for managing dates, in which a recurrence definition that represents a list of dates using a recurrence rule is automatically identified. The recurrence definition may also include a set of exceptions, which account for variations from a recurring pattern in the list of dates. In one embodiment, an efficiency measure is obtained for each of various proposed recurrence definitions, and a recurrence definition that most efficiently represents the list of dates is identified. In one application, an event management (e.g., calendaring) program automatically identifies an efficient recurrence rule for a list of event occurrences. As used herein, unless otherwise noted, the term "set" means one or more (i.e., at least one) and the phrase "any solution" means any now known or later developed solution.

Figure 1:
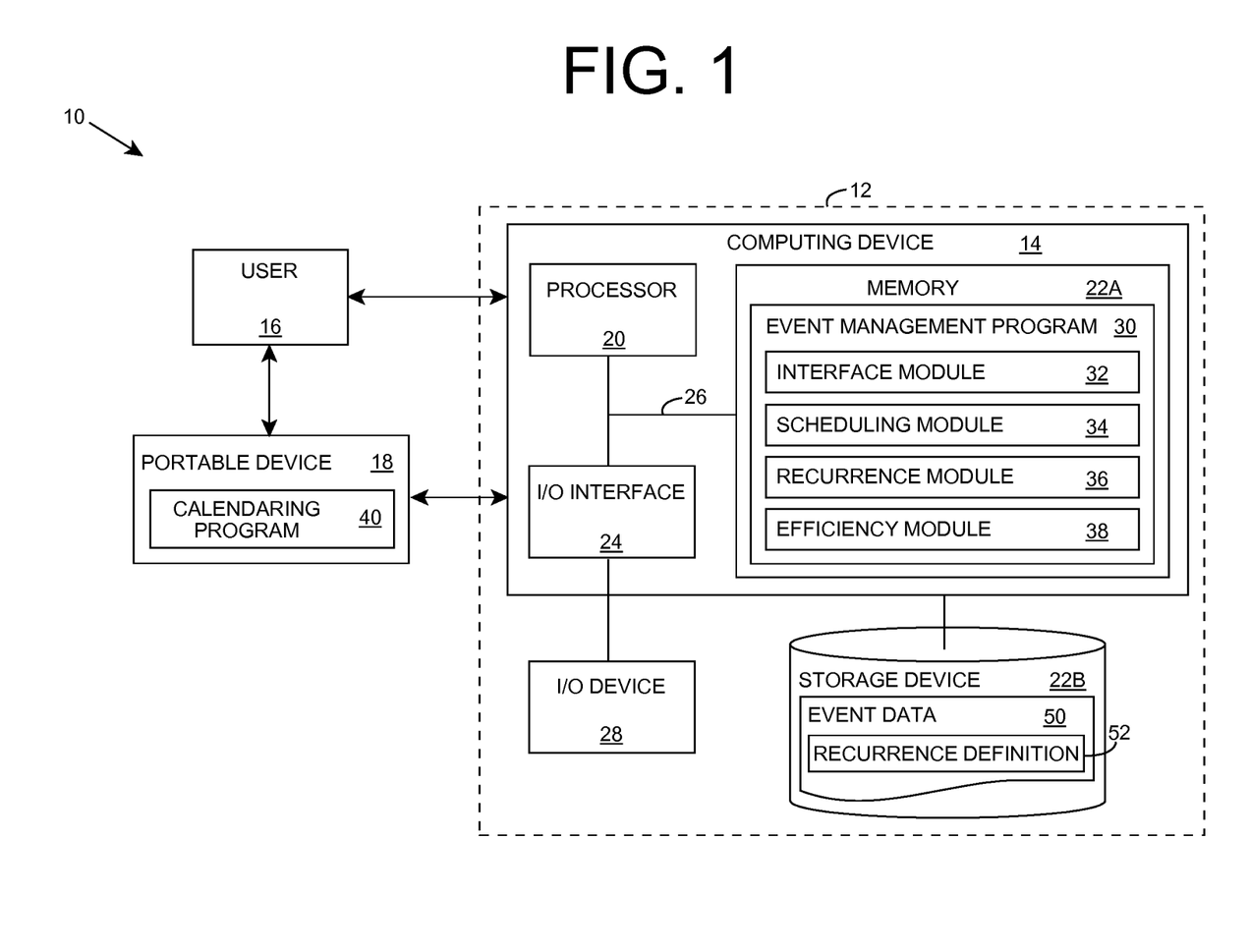
FIG. 1 shows an illustrative environment for managing dates according to an embodiment of the invention.

Turning to the drawings, FIG. 1 shows an illustrative environment 10 for managing dates according to an embodiment of the invention. To this extent, environment 10 includes a computer system 12 that can perform the process described herein in order to manage dates, such as dates included in event data 50. In particular, computer system 12 is shown including a computing device 14 that comprises an event management program 30, which makes computing device 14 operable to manage dates by performing the process described herein. While shown and described herein as being implemented as part of an event management program 30, the invention can be implemented as a stand-alone system, as a "plug-in" to other systems, as part of another type of system that manages dates, and/or the like.

Regardless, computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as event management program 30, which is stored in a storage system, such as memory 22A and/or storage device 22B. While executing program code, processor 20 can read and/or write data, such as event data 50, to/from memory 22A, storage device 22B, and/or I/O interface 24. Bus 26 provides a communications link between each of the components in computing device 14. I/O device 28 can comprise any device that transfers information between a user 16 and/or another computing device, such as portable device 18, and computing device 14. To this extent, I/O device 28 can comprise a user I/O device to enable user 16 to interact with computing device 14 and/or a communications device to enable portable device 18 to communicate with computing device 14 using any type of communications link.

In any event, computing device 14 can comprise any general purpose computing article of manufacture capable of executing program code installed thereon. However, it is understood that computing device 14 and event management program 30 are only representative of various possible equivalent computing devices that may perform the process described herein. To this extent, in other embodiments, the functionality provided by computing device 14 and event management program 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing the invention. For example, in one embodiment, computer system 12 comprises two or more computing devices that communicate over any type of communications link to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, event management program 30 enables computer system 12 to manage dates. To this extent, event management program 30 is shown including an interface module 32, a scheduling module 34, a recurrence module 36, and an efficiency module 38. Operation of each of these modules is discussed further herein. However, it is understood that some of the various modules shown in FIG. 1 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

Regardless, the invention provides a solution for managing dates. In particular, the invention provides a solution for identifying a recurrence definition 52 that represents a list of dates. In an illustrative application, the invention is implemented as part of event management (e.g., calendaring) program 30, which enables user 16 to manage event data 50. Event data 50 can include data on various types of events, such as meetings, reminders, and/or the like. To this extent, interface module 32 can generate a user interface, which can be provided to user 16 to enable user 16 to provide requests for various operations to be performed on event data 50. In particular, the user interface can enable user 16 to add, delete, modify, view, etc., a recurrence definition 52 for an event, change the date/time of a particular event occurrence, and/or the like. Additionally, interface module 32 can define an application program interface (API) or the like that enables another event management system, such as calendaring program 40 on portable device 18, to provide requests for various operations to be performed on event data 50.

Regardless, scheduling module 34 manages the storage of event data 50. To this extent, scheduling module 34 can perform various operations on event data 50 in response to operation requests received by interface module 32. In particular, scheduling module 34 can obtain data for one or more event occurrences or recurrence definitions 52 from event data 50, add, modify, delete one or more event occurrences or recurrence definitions 52 in event data 50, and/or the like. Additionally, scheduling module 34 can monitor event data 50 to determine whether reminder information for a particular upcoming event occurrence should be presented to user 16 and/or portable device 18. If so, interface module 32 can generate an appropriate reminder for the event occurrence for presentation to user 16 and/or portable device 18.

Scheduling module 34 can read and write event data 50 to/from storage systems 22A-B using any solution. For example, event data 50 can be stored as one or more files in a file system, one or more records in a database, and/or the like. Regardless, event data 50 can define various objects/structures that can be manipulated (e.g., modified, added, deleted, etc.) in a dynamic memory using scheduling module 34 and subsequently stored as the one or more files, records, and/or the like. However, it is understood that scheduling module 34 can manage event data 50 using any solution.

Interface module 32 can manage a synchronization operation between event management program 30 and another system, such as calendaring program 40 on portable device 18. In this case, event management program 30 and calendaring program 40 can exchange some or all of event data 50 to ensure that calendaring program 40 and event management program 30 each have a local copy of event data 50 so as to provide similar, consistent information to user 16. The amount of event data 50 synchronized between calendaring program 40 and event management program 30 can be automatically determined (e.g., based on a type of calendaring program 40 and/or event management program 30), selected by user 16, and/or the like.

As a result of a synchronization, scheduling module 34 may receive a list of related event occurrences for storage in event data 50. For example, a list of related events may have the same event name, take place in the same location, and/or the like. Similarly, user 16 could use interface module 32 to separately define a list of related event occurrences. Further, scheduling module 34 may review event data 50 periodically, upon a request from user 16, upon an action performed by user 16, and/or the like, to determine if event data 50 can be stored more efficiently. In any case, scheduling module 34 can obtain a list of dates from a list of related event occurrences for analysis.

Recurrence module 36 identifies a recurrence definition that represents the list of dates. Each recurrence definition includes a recurrence rule. The recurrence rule can be based on any period of time, e.g., days, weeks, months, years, and/or the like. In one embodiment, the recurrence rule can comprise one of four types of recurrence rules: a daily recurrence rule, in which an event occurrence is scheduled once every one or more days; a weekly recurrence rule, in which an event occurrence is scheduled once every one or more weeks; a month by day recurrence rule, in which an event occurrence is scheduled on a particular day (e.g., first Monday, third Wednesday, and/or the like) every one or more months; and a month by date recurrence rule, in which an event occurrence is scheduled on a particular date (e.g., 1st, 15th) every one or more months. It is understood that these types of recurrence rules are only illustrative and numerous variations are possible. For example, a yearly recurrence rule type could be implemented, although the same functionality can be implemented using the month by date recurrence rule type (with the number of months being a multiple of twelve). Similarly, the weekly recurrence rule could be implemented using the daily recurrence rule, in which the number of days is a multiple of seven.

Each recurrence definition can include one or more additional data items. For example, the recurrence definition can include a start date, on which the first event occurrence is scheduled. Further, the recurrence definition can include a total number of event occurrences to be scheduled, an end date, and/or the like. Additional information, such as an event name, a location, a start time (which can be included in the date), a duration, participant(s), and/or the like can be included for each event as is known in the art.

Still further, the recurrence definition can include zero or more exceptions. Each exception identifies a change to the list of dates generated by the recurrence rule. In this manner, a list of dates generated by the recurrence rule can be modified to match the actual list of dates. For example, the recurrence definition can include zero or more cancellations. Each cancellation can identify a particular date determined using the recurrence rule, which has been canceled. Additionally, the recurrence definition can include zero or more reschedules. Each reschedule can identify a particular date determined using the recurrence rule and new data on the actual/rescheduled date (e.g., different date, time, and/or the like). Moreover, the recurrence definition can include zero or more additions. Each addition can include data on an actual/scheduled date that is in addition to the dates defined by the recurrence rule (e.g., a second date within a week for a weekly recurring rule). However, it is understood that an addition can be implemented as a reschedule that does not identify a corresponding date that has been canceled.

Figure 2:
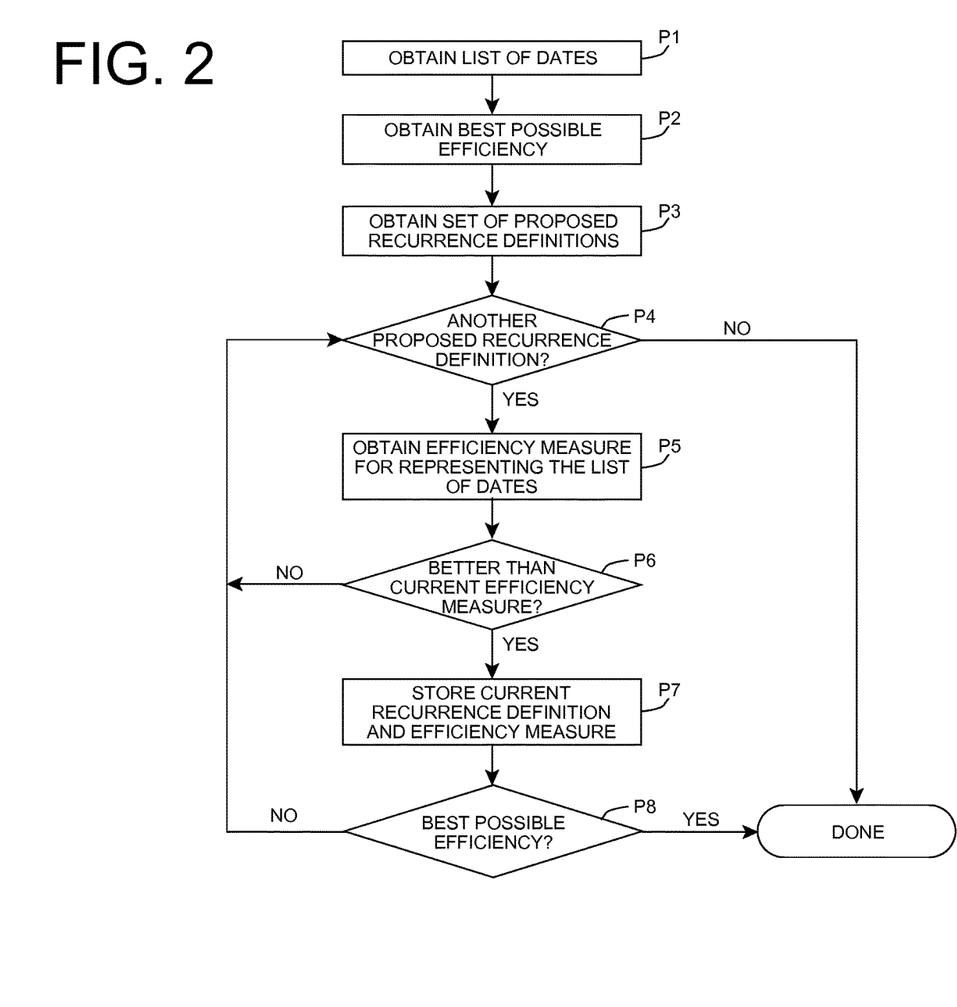
FIG. 2 shows an illustrative flow diagram for identifying a recurrence definition according to an embodiment of the invention.

FIG. 2 shows an illustrative flow diagram for identifying a recurrence definition, which can be implemented by recurrence module 36, according to an embodiment of the invention. Referring to FIGS. 1 and 2, in process P1, recurrence module 36 obtains a list of dates (e.g., from scheduling module 34, another system, a storage device 22B, and/or the like). In process P2, recurrence module 36 obtains a best possible efficiency with which a recurrence definition can represent the list of dates. To this extent, efficiency module 38 can determine the best possible efficiency based on a minimum number of exceptions that will be required to represent the list of dates using a recurrence rule.

Efficiency module 38 can determine the minimum number of exceptions using any solution. In one embodiment, each date includes a time, e.g., corresponding to a start time for an event. In this case, for each date having a different time from a default time for the recurrence rule, a reschedule will be required. To this extent, efficiency module 38 can calculate the minimum number of exceptions by determining an amount of dates that have a most frequent time, and subtracting them from the total number of dates in the list. This difference will include a minimum number of reschedules required to represent the list of dates, which are typically the most resource-intensive exceptions to implement. To convert to a maximum possible efficiency, any formula can be used, such as the following, which will yield a maximum possible efficiency between zero and one:

Max. Possible Efficiency=# of Dates/(# of Dates+ Min. # of Reschedules)    (Equation 1)

In process P3, recurrence module 36 obtains a set of proposed recurrence definitions, each of which includes a proposed recurrence rule. For example, recurrence module 36 can obtain a proposed recurrence definition for each type of recurrence rule (e.g., daily, weekly, etc.). In this case, each type of recurrence rule can be checked to determine which will represent the list of dates most efficiently. However, recurrence module 36 can limit the proposed recurrence definitions to a particular subset of the types. Further, recurrence module 36 can sort the proposed recurrence definitions so that a type of recurrence rule most likely to provide the best solution can be processed first.

In either case, recurrence module 36 can analyze the list of dates to determine the potential effectiveness of each proposed recurrence definition. For example, recurrence module 36 can calculate an average number of days between consecutive dates in the list of dates. Recurrence module 36 can use the resulting average to sort/filter the proposed recurrence definitions. In particular, for an average number of days that is approximately seven, recurrence module 36 can sort the recurrence definitions to process a weekly recurrence rule first, and may not process a yearly recurrence rule, due to a likely high number of exceptions. Similarly, for an average number of days that is approximately thirty, recurrence module 36 can sort the proposed recurrence definitions to process the month by day and month by date recurrence rules first.

In any event, recurrence module 36 can process the set of proposed recurrence definitions to automatically identify a recurrence definition to represent the list of dates. In decision P4, recurrence module 36 determines whether another proposed recurrence definition requires analysis. If so, in process P5, recurrence module 36 obtains an efficiency measure with which the proposed recurrence definition can represent the list of dates. Recurrence module 36 can obtain the efficiency measure using any solution. In one embodiment, recurrence module 36 generates some or all of a recurrence definition that recreates the list of dates using the corresponding recurrence rule and zero or more exceptions, and efficiency module 38 analyzes the exceptions required to determine the corresponding efficiency measure.

For example, efficiency module 38 can sum the total number of exceptions. However, some exceptions, such as a reschedule, may require additional resources (e.g., processing, storage, and/or the like) to process. To this extent, each type of exception can be assigned a weight that reflects the relative resources required. In this case, efficiency module 38 can use a weighted summation of the exceptions to determine the corresponding efficiency measure. For example, when the exceptions include an addition, reschedule, and cancellation, the following formula can be used:

$$\text{Resources} = (\text{\# of Additions} * \text{Addition Weight}) + \\ (\text{\# of Reschedules} * \text{Reschedule Weight}) + \\ (\text{\# of Cancellations} * \text{Cancellation Weight})$$ (Equation 2)

Instead of the maximum possible efficiency calculated using Equation 1, efficiency module 38 can use an alternative measure based on the minimum resources required, which can be calculated as:

Maximum Possible Efficiency=Min. # of Reschedules*Reschedule Weight (Equation 3)

In this case, the required resources can be used as an efficiency measure and compared to the maximum possible efficiency (with a lower value indicating a more efficient representation). Alternatively, efficiency module 38 can convert the resource requirements calculated using Equation 2 to an efficiency measure corresponding to a value between zero and one, and is comparable to the maximum possible efficiency calculated using Equation 1, e.g., using the formula:

Efficiency=(# of Dates*Reschedule Weight)/((# of Dates*Reschedule Weight)+Resources) (Equation 4)

For comparison between the efficiencies provided by the various proposed recurrence definitions, efficiency module 38 can calculate an adjusted efficiency measure. For example, efficiency module 38 can use an adjusted efficiency formula of:

Adjusted Efficiency=Efficiency/Maximum Possible Efficiency (Equation 5)

In decision P6, recurrence module 36 compares the efficiency measure (e.g., adjusted efficiency) of the current proposed recurrence definition with a current efficiency measure (which can be initially set at zero), to determine if the current proposed recurrence definition is more efficient. If so, in process P7, recurrence module 36 stores the current proposed recurrence definition and corresponding efficiency measure for possible use as a recurrence definition for the list of dates. In decision P8, recurrence module 36 determines if the efficiency measure is the best possible efficiency. If so, recurrence module 36 can halt consideration of any remaining proposed recurrence definitions and the current recurrence definition can be identified as the recurrence definition for representing the list of dates. Otherwise, recurrence module 36 can continue processing the next proposed recurrence definition until all proposed recurrence definitions have been considered, at which point the most efficient recurrence definition can be identified as the recurrence definition for representing the list of dates.

It is understood that the process shown is illustrative only. To this extent, some or all of the processing performed can be implemented concurrently. For example, rather than recurrence module 36 completely recreating a list of dates in process P5 and comparing the corresponding efficiency measure with a current efficiency measure in process P6, efficiency module 38 can periodically recalculate a minimum efficiency, e.g., after recurrence module 36 adds a new exception to the recurrence definition. In this case, should the minimum efficiency for the current proposed recurrence definition go above a current (non-zero) efficiency measure for a recurrence definition, then recurrence module 36 can stop processing the proposed recurrence definition (since it will not be better than the current one). Similarly, if a best possible efficiency determined in process P3 or an efficiency measure for a proposed recurrence definition obtained in process P5 is worse than a minimum efficiency, then the corresponding proposed recurrence definition(s) can be rejected as not providing a minimal efficiency. For example, the minimal efficiency could comprise an efficiency with which some resource benefit is obtained over storing and processing the list of dates (e.g., an efficiency greater than fifty percent using Equation 1 since this would indicate all events would require rescheduling).

Figure 3A:
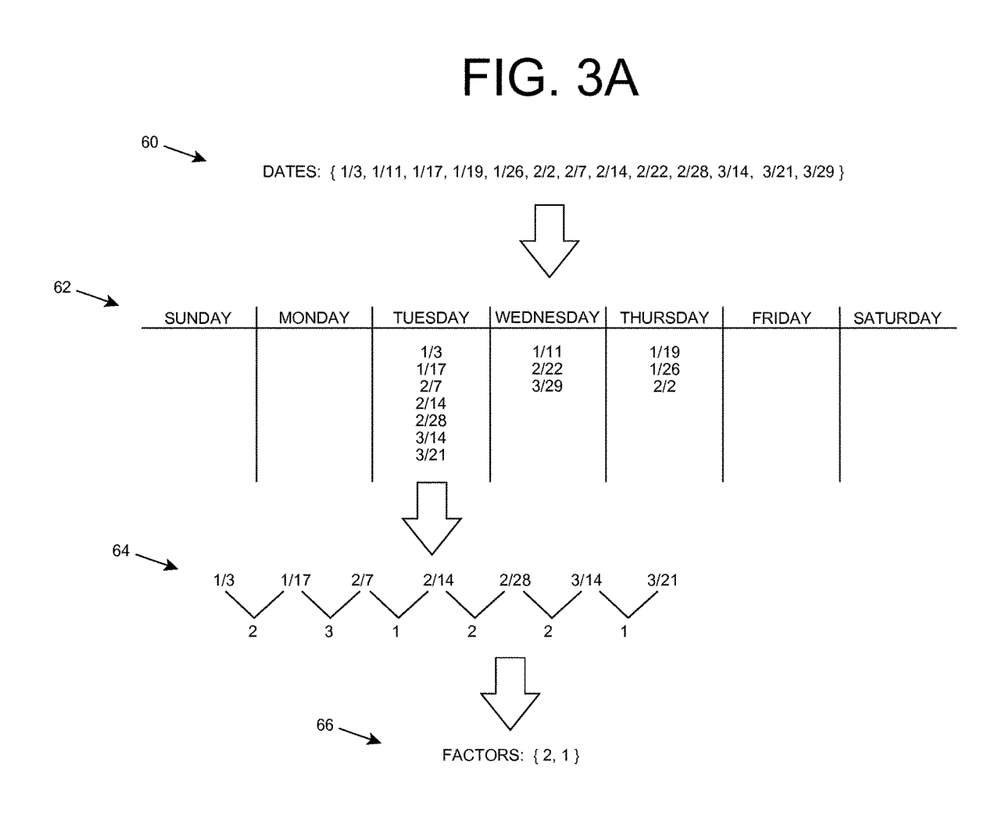
FIGS. 3A-B show an illustrative data flow for generating a recurrence definition according to an embodiment of the invention.
Figure 3B:
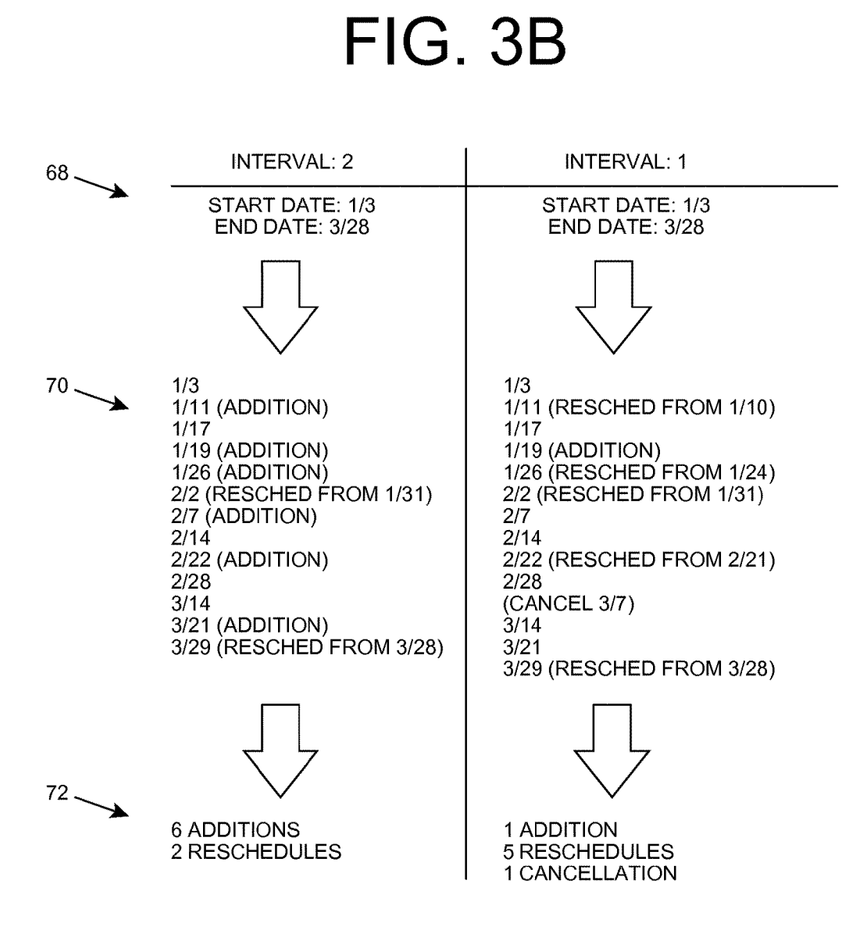

As noted, recurrence module 36 can generate a recurrence definition that represents the list of dates using a recurrence rule and zero or more exceptions. FIGS. 3A-B show an illustrative data flow that recurrence module 36 can use to generate the recurrence definition according to an embodiment of the invention. In particular, recurrence module 36 obtains a set of dates 60. Based on the set of dates 60, recurrence module 36 can obtain a likely interval for the proposed recurrence rule. For example, when the recurrence rule comprises a daily recurrence rule, recurrence module 36 can use a likely interval based on an average number of days between consecutive dates, a most common number of days between consecutive dates, a number of days that most frequently occurs as an interval between both neighbors of dates (e.g., preceding and next), and/or the like.

Figure 4:
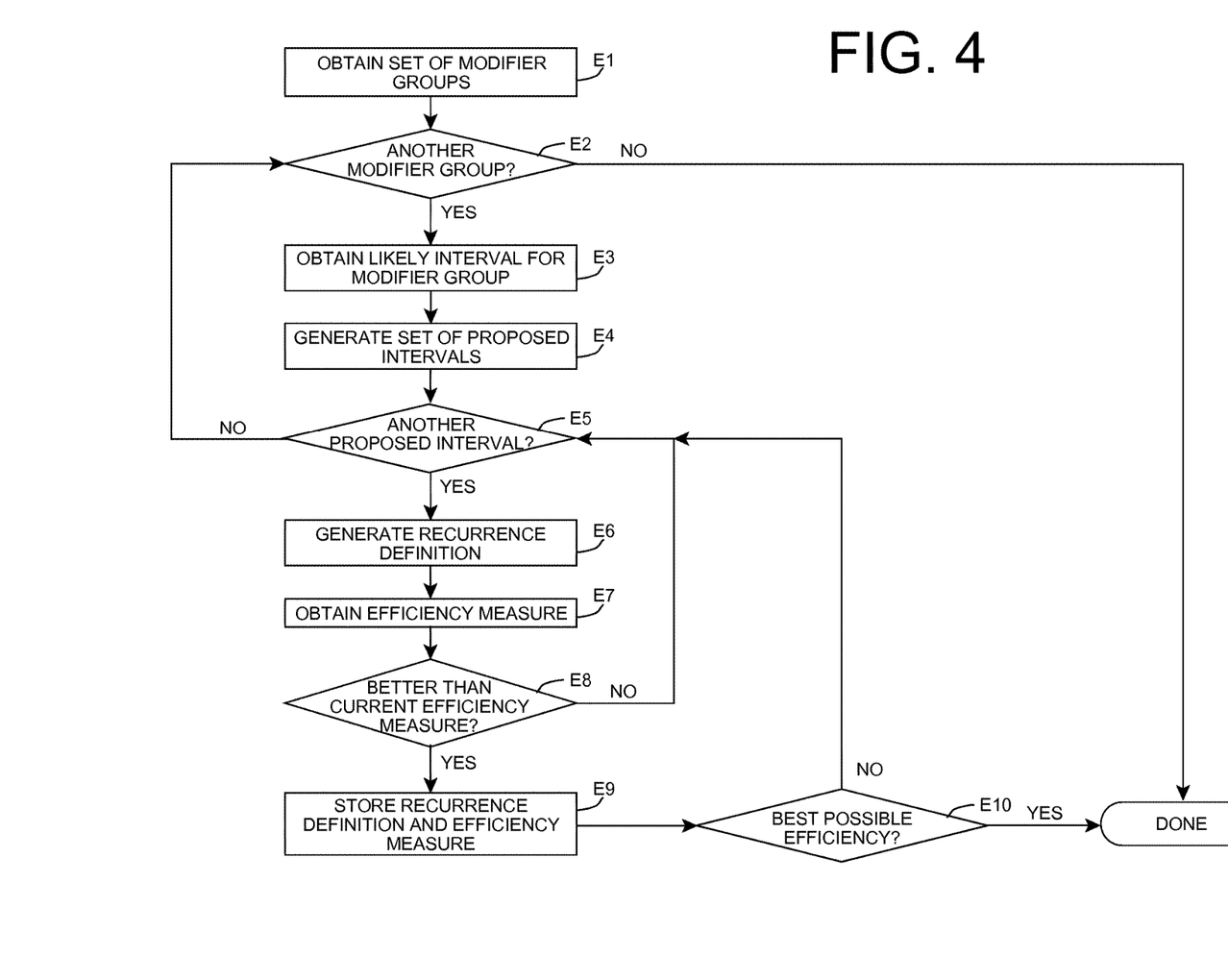
FIG. 4 shows an illustrative flow diagram for obtaining an efficiency measure according to an embodiment of the invention.

Some recurrence rules include a plurality of internal modifiers. For example, a weekly recurrence rule includes internal modifiers corresponding to each day of the week, a monthly recurrence rule includes internal modifiers corresponding to days of the month, etc. In this case, FIG. 4 shows an illustrative flow diagram that can be implemented by recurrence module 36 (FIG. 1) to obtain an efficiency measure according to an embodiment of the invention. Referring to FIGS. 3A-B and 4, in process E1, recurrence module 36 obtains a set of modifier groups 62 (e.g., Tuesday, Wednesday, Thursday), each of which corresponds to a unique internal modifier that includes one or more of the list of dates. In decision E2, recurrence module 36 determines whether another modifier group 62 requires processing. Each the set of modifier groups 62 can be processed in any order. For example, recurrence module 36 can initially select the modifier group 62 having the most dates (e.g., Tuesday) and process the remaining modifier groups in descending order based on the corresponding number of dates. Recurrence module 36 can use any solution to break a tie between two or more modifier groups.

In any event, in process E3, recurrence module 36 obtains a likely interval for the modifier group. For example, recurrence module 36 can determine a likely interval based on the dates 64 in the modifier group. To this extent, recurrence module 36 can identify a number of weeks that most frequently occurs as an interval between both neighbors of dates 64 in the modifier group, e.g., two for dates 64. Alternatively, recurrence module 36 can identify a number of weeks that most frequently occurs, a number of weeks having the highest number of consecutive occurrences, an average/median/mode for the number of weeks, and/or the like. Recurrence module 36 can use any solution to break a tie between two or more number of weeks (e.g., select the higher one, use all, or the like).

Regardless, in process E4, recurrence module 36 generates a set of proposed intervals for the proposed recurrence rule based on the likely interval(s). For example, recurrence module 36 can obtain a set of factors 66 for the likely interval(s), one or more of which can be used as the set of proposed intervals. In one embodiment, recurrence module 36 uses the entire set of factors (which includes the likely interval and one). However, in another embodiment, recurrence module 36 may select only a subset of factors using any solution, e.g., an interval of twelve for a monthly recurrence rule can be left out of a set of proposed intervals when a yearly recurrence rule has been considered.

In decision E5, recurrence module 36 (FIG. 1) determines if another proposed interval requires processing. Recurrence module 36 can process the proposed intervals in any order. For example, recurrence module 36 can start with the highest proposed interval and process the remaining proposed intervals in descending order. Regardless, in process E6, recurrence module 36 generates some or all of a recurrence definition that represents the list of dates using the recurrence rule and the proposed interval. For example, recurrence module 36 can obtain a start date and end date 68 for the recurrence definition. The start and end dates can be selected to correspond with the dates used to determine the most likely interval (e.g., 2/28 in dates 64) on which the proposed interval is based. Further, the start and end dates can be selected to start and end as close as possible to the first date (e.g., 1/3) in the list of dates 60 and the last date (e.g., 3/29) in the list of dates 60, respectively.

Recurrence module 36 can generate a representation 70 of the list of dates 60 that uses the recurrence rule, start/end dates, and zero or more exceptions. For example, recurrence module 36 can sequentially process each date in the list of dates 60, and generate a corresponding exception for each date that is not accurately represented using the recurrence rule alone. FIG. 3B shows illustrative representations 70 for both intervals in the set of possible intervals 66. After representing each date in the list of dates 60, recurrence module 36 will have generated a complete recurrence definition for the list of dates, which includes start and end dates 68, a recurrence rule, and zero or more exceptions (e.g., addition, reschedule, cancellation).

In process E7, efficiency module 38 can obtain an efficiency measure for the recurrence definition. For example, for the interval of two shown in FIG. 3B, the recurrence definition requires a set of exceptions 72 that includes six additions and two reschedules, while for the interval of one, the recurrence definition requires a set of exceptions 72 that includes one addition and five reschedules, and one cancellation. Using Equations 2 and 4, and respective weights of: 5 for a reschedule; 4 for an addition; and 1 for a cancellation, the respective efficiencies are:

Interval Two Efficiency=(13*5)/((13*5)+(6*4)+(2*5)+(0*1))=0.66

Interval One Efficiency=(13*5)/((13*5)+(1*4)+(5*5)+(1*1))=0.68

Efficiency module 38 also can generate an adjusted efficiency for each interval using, for example, Equations 1 and 5. In this case, the adjusted efficiency can be used as the efficiency measure for the corresponding recurrence definition.

In decision E8, recurrence module 36 (FIG. 1) can determine if the efficiency measure is better than a current efficiency measure. If so, in process E9, recurrence module 36 can store the recurrence definition and efficiency measure, and in process E10, recurrence module 36 can determine if the efficiency measure is the best possible efficiency. If not, processing can return to decision E5. In general, recurrence module 36 can repeat the process illustrated in FIG. 4 for each interval in the set of proposed intervals 66. Additionally, if used, recurrence module 36 also can repeat the process for each modifier group in the set of modifier groups 62.

After analyzing each combination (or finding one having the best possible efficiency), recurrence module 36 can select the recurrence definition that most efficiently represents the list of dates. This recurrence definition and the corresponding efficiency measure can be used in process P5 (FIG. 2) for the particular proposed recurrence definition. However, it is understood that recurrence module 36 may implement one or more optimizations to improve performance of the process. For example, recurrence module 36 can stop generating a proposed recurrence definition once a minimum efficiency has exceeded a particular level (e.g., current efficiency measure), not consider modifier groups having fewer than a minimum percentage of the dates, and/or the like.

Returning to FIG. 1, after recurrence module 36 identifies a recurrence definition 52 for the set of dates, event management program 30 can use the recurrence definition 52 in any type of application. For example, scheduling module 34 can store the recurrence definition 52 in event data 50 in place of the set of dates, which were defined by a user 16, received from calendaring program 40, and/or the like. Further, interface module 32 can provide the recurrence definition 52 for used by calendaring program 40. Still further, scheduling module 34 can compare the recurrence definition 52 with an existing recurrence definition that represents the same set of dates, and replace the existing recurrence definition with the recurrence definition 52 when the recurrence definition 52 is more efficient. It is understood that numerous other applications for recurrence definition 52 are possible, as will be recognized by one skilled in the art.

While shown and described herein as a method and system for managing dates, it is understood that the invention further provides various alternative embodiments. For example, in one embodiment, the invention provides a computer program stored on a computer-readable medium, which when executed, enables a computer system to manage dates. To this extent, the computer-readable medium includes program code, such as event management program 30 (FIG. 1), which implements the process described herein. It is understood that the term "computer-readable medium" comprises one or more of any type of tangible medium of expression (e.g., physical embodiment) of the program code. In particular, the computer-readable medium can comprise program code embodied on one or more portable storage articles of manufacture, on one or more data storage portions of a computing device, as a data signal traveling over a network (e.g., during a wired/wireless electronic distribution of the computer program), on paper (e.g., capable of being scanned and converted to electronic data), and/or the like.

In another embodiment, the invention provides a method of generating a system for managing dates. In this case, a computer system, such as computer system 12 (FIG. 1), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 1), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that performs the process described herein on a subscription, advertising, and/or fee basis. That is, a service provider, such as an Application Integrator, could offer to manage dates as described herein. In this case, the service provider can manage (e.g., create, maintain, support, etc.) a computer system, such as computer system 12 (FIG. 1), that performs the process described herein for one or more customers. In return, the service provider can receive payment from the customer(s) under a subscription and/or fee agreement, receive payment from the sale of advertising to one or more third parties, and/or the like.

As used herein, it is understood that "program code" means any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as some or all of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer-implemented method of managing dates using a recurrence definition, comprising:
   obtaining, by a first computer system from a second computer system over a communications network, a list of dates of previously-scheduled event occurrences, using a processor of the first computer system; and
   executing stored instructions, by the processor, to improve storage efficiency of a storage device from which a scheduling module operating on the first computer system manages storage of event data, comprising:
      from the list of dates of occurrences, using the processor for programmatically determining a recurrence definition that represents the list of dates of occurrences, the recurrence definition comprising a recurrence rule from which the dates of occurrences can be recreated; and
      storing the determined recurrence definition on the storage device instead of storing the list of dates of occurrences.

2. The method of claim 1, wherein the obtaining comprises receiving the list of dates during a synchronization operation for synchronizing dates between a first electronic calendar system executing on the first computer system and a second electronic calendar system executing on the second computer system.

3. The method of claim 1, further comprising using the processor for:
   determining an efficiency measure of the programmatically determined recurrence definition and an efficiency measure of a previously-determined recurrence definition that represents the list of dates and which comprises a different recurrence rule from which the dates can be recreated; and
   replacing the previously-determined recurrence definition, on the storage device, with the programmatically determined recurrence definition when the determined efficiency measures indicate that the programmatically determined recurrence definition is more efficient than the previously-determined recurrence definition.

4. The method of claim 1, wherein the programmatically determining further comprises:
   calculating, for each of a plurality of proposed recurrence definitions, a corresponding efficiency measure for representing the list of dates, based on how many exceptions are required for recreating the dates using the recurrence rule of the proposed recurrence definition, an exception comprising a change from a selected one of the dates recreatable using the recurrence rule to match a different date present in the list of predetermined dates; and
   selecting one of the plurality of proposed recurrence definitions for use as the recurrence definition based on the corresponding efficiency measures.

5. The method of claim 1, wherein the programmatically determining further comprises:
   determining a set of proposed recurrence rules for the recurrence definition;
   calculating, for at least one combination of a proposed recurrence rule in the set of proposed recurrence rules and a proposed interval in a set of proposed intervals for the proposed recurrence rule, a corresponding efficiency measure for representing the list of dates, based on how many exceptions are required for recreating the dates using the proposed recurrence rule, an exception comprising a change from a selected one of the dates recreatable using the recurrence rule to match a different date present in the list of predetermined dates; and selecting the at least one combination of a proposed recurrence rule and a proposed interval for the recurrence definition based on the corresponding efficiency measure.

6. The method of claim 5, further comprising using the processor for:

determining a set of modifier groups for a proposed recurrence rule in the set of proposed recurrence rules, each modifier group corresponding to a unique internal modifier that classifies the dates for the proposed recurrence rule and each modifier group including at least one of the list of dates; and determining the set of proposed intervals based on at least one of the set of modifier groups.

7. The method of claim 5, further comprising using the processor for:

determining a likely interval for the recurrence rule, based on a number of time units between neighboring dates in the list of dates;

determining a set of factors for the likely interval; and including at least one of the set of factors in the set of proposed intervals.

8. A system for managing dates using a recurrence definition, comprising:

a first computer system comprising a processor; and instructions which are executable, using the processor, to implement functions comprising:

obtaining, by the first computer system from a second computer system over a communications network, a list of dates of previously-scheduled event occurrences; and improving storage efficiency of a storage device from which a scheduling module operating on the first computer system manages storage of event data, comprising:

from the list of dates of occurrences, programmatically determining a recurrence definition that represents the list of dates of occurrences, the recurrence definition comprising a recurrence rule from which the dates of occurrences can be recreated; and storing the determined recurrence definition on the storage device instead of storing the list of dates of occurrences.

9. The system of claim 8, wherein the obtaining comprises receiving the list of dates during a synchronization operation for synchronizing dates between a first event management system executing on the first computer system and a second event management system executing on the second computer system.

10. The system of claim 8, wherein the functions further comprise:

determining an efficiency measure of the programmatically determined recurrence definition and an efficiency measure of a previously-determined recurrence definition that represents the list of dates and which comprises a different recurrence rule from which the dates can be recreated; and replacing the previously-determined recurrence definition, on the storage device, with the programmatically determined recurrence definition when the determined efficiency measures indicate that the programmatically determined recurrence definition is more efficient than the previously-determined recurrence definition.

11. The system of claim 8, wherein the programmatically determining further comprises:

determining, for each of a plurality of proposed recurrence definitions, a corresponding efficiency measure for representing the list of dates, based on how many exceptions are required for recreating the dates using the recurrence rule of the proposed recurrence definition, an exception comprising a change from a selected one of the dates recreatable using the recurrence rule to match a different date present in the list of predetermined dates; and selecting one of the plurality of proposed recurrence definitions for use as the recurrence definition based on the corresponding efficiency measures.

12. The system of claim 8, wherein the programmatically determining further comprises:

determining a set of proposed recurrence rules for the recurrence definition;

calculating, for at least one combination of a proposed recurrence rule in the set of proposed recurrence rules and a proposed interval in a set of proposed intervals for the proposed recurrence rule, a corresponding efficiency measure for representing the list of dates, based on how many exceptions are required for recreating the dates using the proposed recurrence rule, an exception comprising a change from a selected one of the dates recreatable using the recurrence rule to match a different date present in the list of predetermined dates; and selecting the at least one combination of a proposed recurrence rule and a proposed interval for the recurrence definition based on the corresponding efficiency measure.

13. The system of claim 12, wherein the functions further comprise:

determining a set of modifier groups for a proposed recurrence rule in the set of proposed recurrence rules, each modifier group corresponding to a unique internal modifier that classifies the dates for the proposed recurrence rule and each modifier group including at least one of the list of dates; and determining the set of proposed intervals based on at least one of the set of modifier groups.

14. The system of claim 12, wherein the functions further comprise:

determining a likely interval for the recurrence rule, based on a number of time units between neighboring dates in the list of dates;

determining a set of factors for the likely interval; and including at least one of the set of factors in the set of proposed intervals.

15. A computer-implemented method of managing previously-scheduled event occurrence dates for an electronic system using a recurrence definition, comprising using a processor of a first computer system to perform:

obtaining, by the first computer system from a second computer system over a communications network, a list comprising a plurality of dates, each of the dates representing a previously-scheduled event occurrence; and executing stored instructions, by the processor, to improve storage efficiency of a storage device from which a scheduling module operating on the first computer system manages storage of event data, comprising:

sorting the list of dates into sequential order;

determining a most common number of days between consecutive ones of the dates in the sorted list of dates;

responsive to determining that the most common number is approximately 7 or 30, selecting to use a weekly or monthly recurrence rule type, respectively, and otherwise selecting to use a daily recurrence rule type;

choosing a set of modifier groups corresponding to the selected recurrence rule type;

organizing each of the dates into a corresponding one of the modifier groups in the chosen set, wherein each of the dates corresponds to only a unique one of the modifier groups in the chosen set;

selecting, from the modifier groups, a particular one having a highest number of dates organized therein;

calculating a number of time units between each pair of consecutive ones of the dates organized into the selected modifier group, the time units corresponding to the selected recurrence rule type;

selecting a most common one of the calculated number of time units as a first proposed interval for the particular modifier group and selecting one as a second proposed interval for the particular modifier group;

determining a starting date and an ending date for the plurality of dates, the starting date being an earliest of the dates in the list and the ending date being a latest of the dates in the list;

generating a first representation of dates and a second representation of dates, comprising:

setting a first date in the first and the second representations equal to the starting date; and iteratively computing, for the first and the second representations until reaching the ending date, a next date in the first and the second representations by adding a number of days corresponding to the first and the second interval, respectively, to a next-previous date in the respective representation;

comparing, for each of the first and the second representations as a sequence, the dates therein to the dates in the sorted list to determine a count of matching dates in each of the first and the second representations and a count of non-matching dates in each of the first and the second representations;

multiplying, for each of the first and the second representations, the count of non-matching dates by an exceptions multiplier to generate an exceptions cost for each of the first and the second representations;

selecting, as a determined interval, either the first interval or the second interval based on a lower of the corresponding exceptions cost; and storing, on the storage device instead of storing the list of dates, a recurrence definition from which the list of dates can be recreated, the recurrence definition comprising the recurrence definition type, the selected interval, the start date, the ending date, and an exceptions list, wherein the exceptions list comprises each non-matching date from the representation corresponding to the selected interval.

16. The method according to claim 15, wherein the modifier groups in the set comprise days of a calendar week when the recurrence rule type is weekly.

17. The method according to claim 15, wherein the modifier groups in the set comprise months of a calendar year when the recurrence rule type is monthly.

\* \* \* \* \*